Patented Apr. 23, 1929.

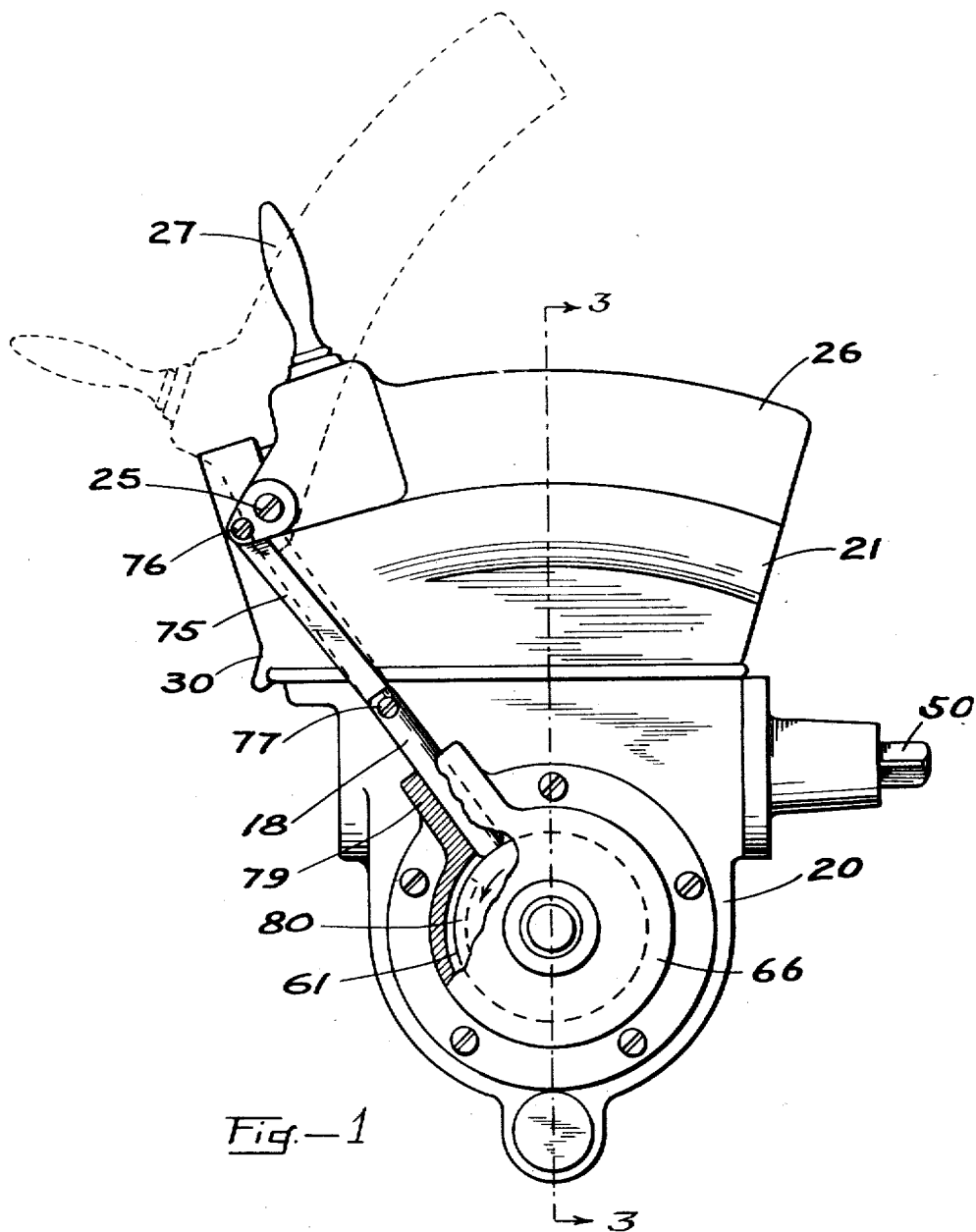

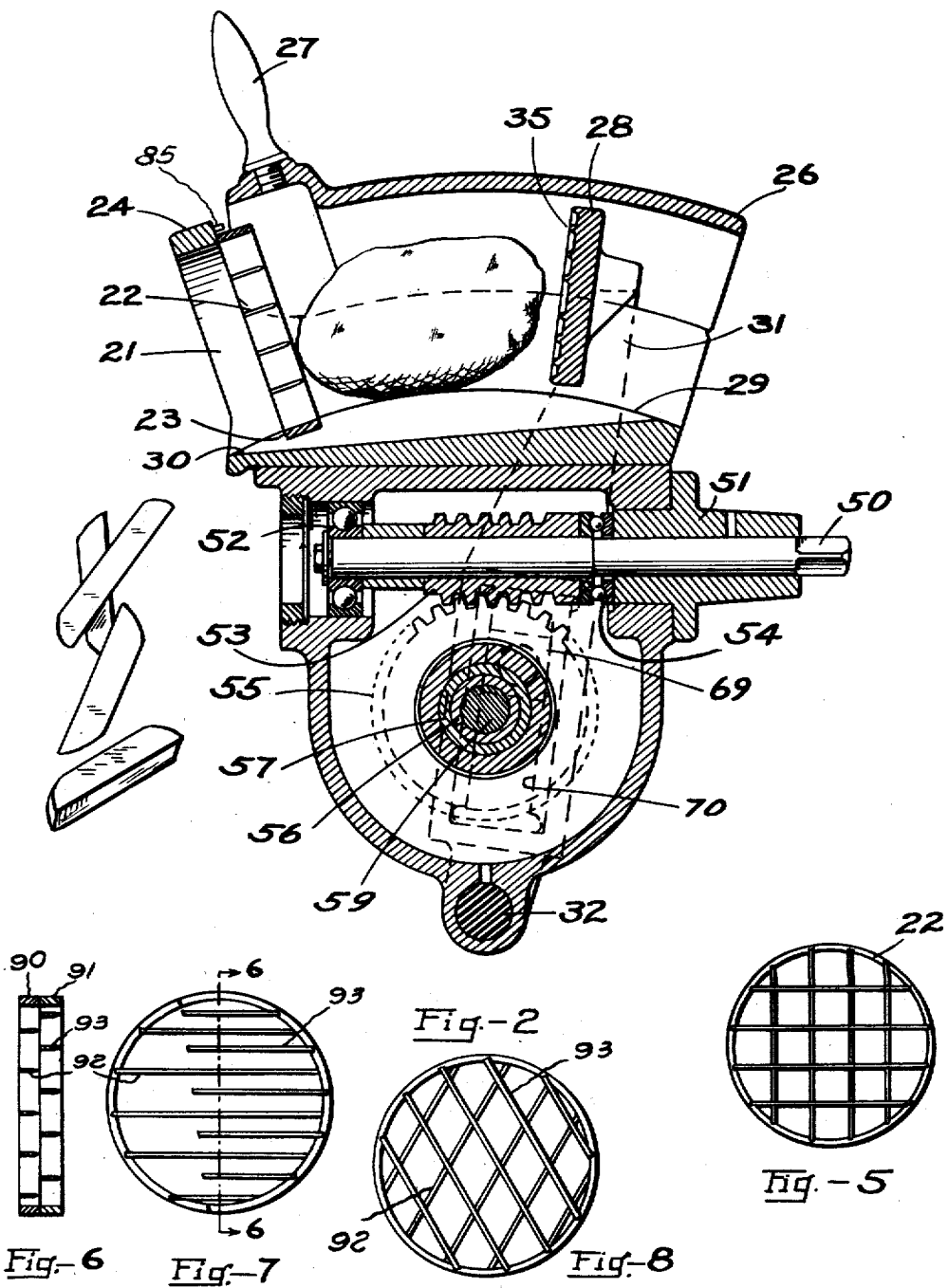

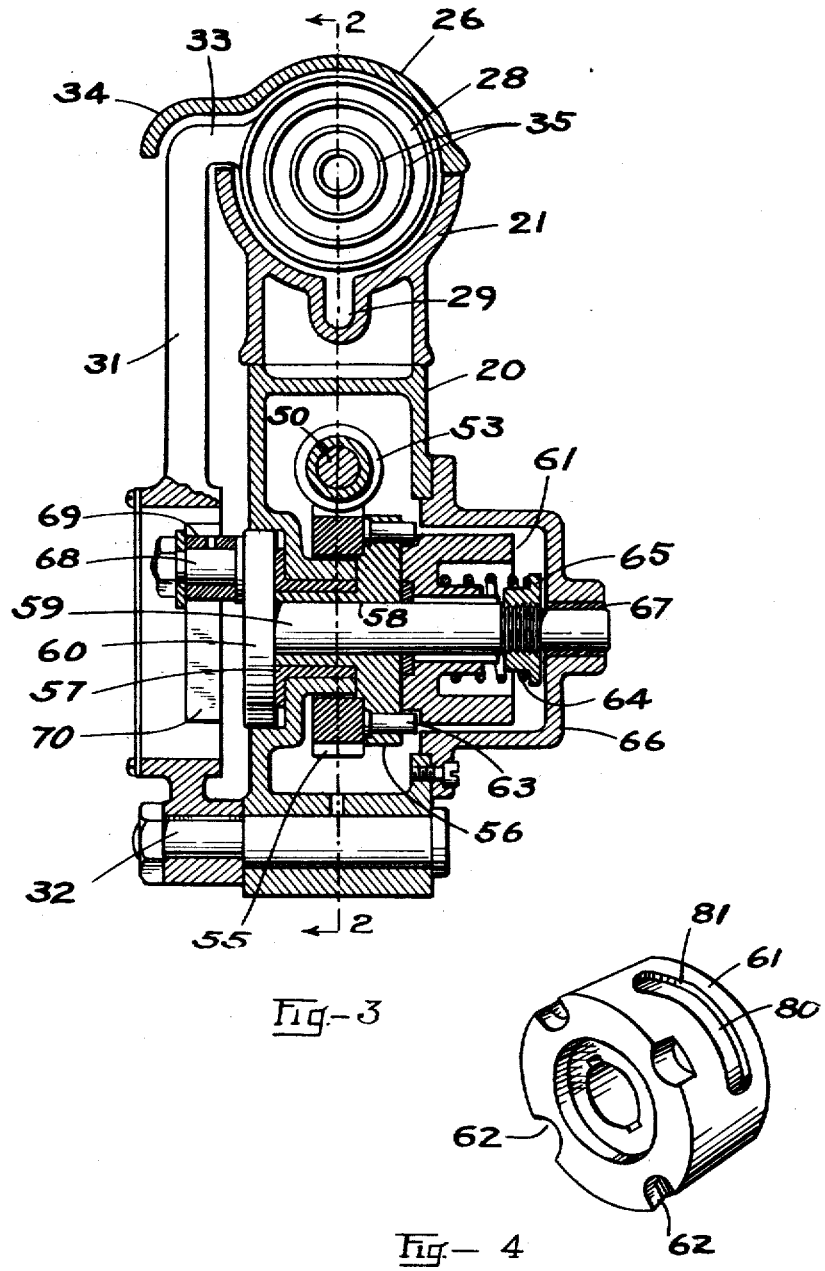

1,709,912

UNITED STATES PATENT OFFICE.

HERBERT L. JOHNSTON, OF TROY, OHIO, ASSIGNOR TO THE HOBART MANUFACTURING CO., OF TROY, OHIO, A CORPORATION OF OHIO.

APPARATUS FOR CUTTING FOODSTUFFS.

Application filed June 13, 1924. Serial No. 719,804.

The present invention relates to apparatus for cutting food stuffs.

One of the principal objects of the invention is to provide such an apparatus as a potato slicer, or the like, having a novel construction, combination and arrangement of parts or elements therein, which will be simple, reliable and safe in operation, and which may be conveniently and economically manufactured.

Further objects and advantages of the present invention will be apparent from the following description when taken in connection with the accompanying drawings in which Fig. 1 is a side elevation of the invention;

Fig. 2 is a vertical sectional view on the line 2—2 of Fig. 3;

Fig. 3 is a vertical sectional view on the line 3—3 of Fig. 1;

Fig. 4 is a perspective view of a clutch member forming part of the present invention;

Fig. 5 is an elevation of the grid cutting member employed in the present apparatus;

Fig. 6 is a sectional view on the line 6—6 of Fig. 7 of a grid made in two sections;

Fig. 7 is an elevation of same, set to produce thin slices, the left side of the upper section being broken away in order to better show which blades belong to the upper section and which to the lower; and Fig. 8 is an elevation of the same, set to produce lozenge shaped pieces.

The invention is herein shown as embodied in a machine for cutting potatoes, but it will be understood that the invention is susceptible of other applications and is not confined to the embodiment illustrated.

Referring to the drawings, 20 designates a gear case or housing containing driving mechanism and on top of the gear case 20 there is mounted a trough 21 adapted to receive potatoes or other forms of food stuffs to be cut up. The trough is upwardly curved and is provided within the forward end thereof with a grid-like cutting member 22 which is removably supported therein, the lower portion of the cutting member lying in the groove 23 formed in the bottom and sides of the trough and the upper portion resting against the ring member 24 forming part of the trough. The cutting member may be readily removed from the trough for cleaning or for other purposes by simply lifting it out of the trough. Pivotally secured to the trough as at 25 is a guard or cover 26 which, when it is closed, forms with the trough 21 a closed chamber, guide or enclosure which is adapted to receive the potatoes to be cut and to guide the same during cutting. Access may be gained to the interior of the closed chamber or enclosure for the insertion of potatoes by tilting the guard or cover 26 to the dotted line position shown in Fig. 1, a handle 27 being provided for this purpose. The enclosure or trough as herein shown, is constructed to receive and cut potatoes singly, but it will be understood the apparatus is not limited to this particular construction, it being obvious that the trough and coordinating mechanism may be constructed of a size to cut any desired number of potatoes at one time.

A pusher member 28 is mounted for axial movement through the enclosure or along the trough and serves, on its forward movement to push the potato through the cutting member thereby cutting the potato into long pieces of rectangular cross section, as shown at the left of Fig. 2, which are adapted for French frying. By varying the construction of the grid the potatoes may be cut into pieces of any desired size and form. At the conclusion of this forward movement, the pusher member is moved rearwardly to a position which will permit the insertion of another potato. The trough is provided with a drain passage or groove 29 which slopes downwardly from the right hand or rear portion of the trough to the forward end thereof whereby juices are discharged at the mouth 30. A series of concentrically disposed ridges or gripping devices 35 are formed on the pushing surface of pusher member 28 to prevent undesirable movement or slipping of the potato after the pusher member has come into engagement with it. The pusher member 28 is carried by a crank arm 31 pivoted to the gear case at 32. The crank arm extends upwardly along side the trough and is provided at its upper end with a horizontally extending member or finger 33 which supports the pusher member 28, both the member 33 and the pusher member 28 clearing all parts of the trough or enclosure and being out of contact therewith, as is shown clearly in Fig. 3. This manner of supporting the pusher member is such that the pusher member does not come in contact with the trough or enclosure or any guides therein and therefore cannot wear off the protective coating of such parts, such as tin or zinc, thereby causing the parts to corrode and stain the potatoes or other food stuffs which are being cut. As best shown in Fig. 3, the cover 26 is spaced at one side from the upper edge of the trough 21 to provide a slot for the movement of the member 33, and the cover 26 is formed with a laterally and downwardly extending flange 34 which overhangs and protects the crank arm from interference from above and also serves as a protection to the attendant who may be operating the cover while the crank arm is in motion.

The pusher member 28 is actuated by the mechanism which will now be described. Driving shaft 50 which is adapted to be rotated by any suitable or desired means is rotatably supported in bearings 51 and 52 in opposite walls of the gear case 20 as shown in Fig. 2. A worm 53 is secured on the driving shaft between the bearings 51 and 52, a thrust bearing 54 being interposed between the bearing 51 and the worm 53 to take up the end thrust. The worm 53 is in engagement with a ring worm gear 55 carried by the carrier member 56 which is rotatably supported in bearing 57 from one wall of the gear case. The carrier 56 is provided with a central bore or aperture 58 which provides a bearing for crank shaft 59 having at one end thereof a disc 60 bearing against the bearing 57. Slidably mounted and keyed upon the other end of the crank shaft 59 is a clutch block or member 61 which is provided with four notches 62 adapted to engage the four pins 63 projecting from the carrier member 56. The clutch member 61 is normally held in clutching position with its notches 62 receiving the pins 63 by means of spring 64 which is tensioned by the adjustable collar 65 mounted on the crank shaft 59. The gear case 20 is provided with a detachable cap or cover 66 by which access may be gained to the interior of the gear case for inspection or repair of the parts. A bearing 67 is also formed in the cap for one end of the crank shaft 59. The disc 60 on the end of the crank shaft 59 carries a crank pin 68 and a sliding block 69 which latter is adapted to slide in a yoke 70 formed in the lower portion of the crank arm 31.

Upon rotation of the driving shaft 50, it will be apparent that power is transmitted through the worm 53 and ring gear 55 and carrier 56 to the clutch member 61 which is keyed to the crank shaft 59, thereby causing rotation of the latter and a rocking or oscillating movement of the crank arm 31. With one complete revolution of the crank shaft 59 the pusher member 28 is caused to move from its rearward position shown in Fig. 2 forwardly towards the cutting member and then to return to its rearward position. Since the crank arm 31 is pivoted below the crank shaft 59 it will be apparent that the pusher member 28 has a slow forward motion and a relatively quick return motion.

As a protective feature the present invention is provided with means for preventing any forward motion of the pusher member 28 while the cover 26 is raised so as to give access to the interior of the enclosure formed by the trough 21 and the cover 26, thus protecting the operator from possible injury. A link 75 is pivotally connected at 76 and 77 with the cover 26 and a plunger 78 respectively. The plunger 78 slides in the guide or boss 79 formed in the gear case cover 66 and is adapted to cooperate with cam slot 80 formed in the peripheral surface of the clutch member 61. As shown in Fig. 1 which indicates the relation of the plunger 79 and clutch member 61 during the forward movement of the pusher member, the plunger 78 is in engagement with the peripheral surface of the clutch member and the cover 26 is therefore locked in its closed position as shown by the full lines in Fig. 1. During the rearward movement of the pusher member 28 the forward end of the cam slot 80 comes under the plunger 78. The operator is now free to raise the cover 26, and when this is done the plunger 78 drops into the cam slot 80, where it remains so long as the cover is in raised position.

Referring to Fig. 4 it will be seen that the cam slot 80 is of some length which gives the operator ample time to raise the cover 26 on the return movement of the pusher member to insert another potato in the trough, but should the cover be held open for too long a time, then the plunger 78 rides upon the inclined portion 81 of the cam slot, moving the clutch member 61 to the right, thereby disengaging the pins 63 from the slots 62 and automatically discontinuing the application of power to the pusher member 28. The pusher member therefore comes to rest in its most rearward position, and forward movement of the pusher member cannot be resumed until the cover 26 is closed and the plunger 78 is withdrawn from the cam slot 80 so as to permit the clutch member 61 to again come into engagement with the pins 63 of the carrier. It will be apparent from the foregoing that the cam slot 80 and the cooperating members which are connected with the cover 26, constitute an interlock which positively prevents the lifting of the cover 26 to give access to the food-receiving trough or enclosure during the forward or cutting movement of the pusher member 28, and that thereafter this same interlock prevents the application of power to give a forward movement of the pusher member so long as the cover is raised.

If desired a retaining pin 85 may be inserted in the member 24 to prevent accidental displacement of the grid during operation.

The grid may be made in a variety of designs. One form shown in Fig. 6 consists of two duplicate parts, 90 and 91. These are fitted with blades 92 and 93, equally spaced but so positioned with reference to the center of the grid that when the sections are super-posed one above the other, the blades can be made to coincide or if one of the sections be revolved half way around they will take a position as shown in Fig. 6 and Fig. 7, wherein the blades of one section are mid-way between those of the other. This setting produces thinner slices, double in number to those produced when the blades are set to coincide.

If the grid sections are so set that the blades cross at 60° the resulting shape will be like Fig. 8 which produces bars of lozenge shaped section.

By changing the arrangement of blades in the grid sections and setting them in different relation to each other an almost unlimited variety of shapes can be obtained.

While two sections are shown any number might be employed without departing from the spirit of the invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An apparatus of the character described adapted for cutting food stuffs, comprising a container adapted to receive food stuffs, a cover member for said container forming an enclosure therewith, said cover member being mounted for movement to permit access to the interior of said container for supplying food stuffs thereto, means operable within the container for cutting the food stuffs, and means for preventing the operation of the said cutting means while said cover member is in position to permit access to the interior of said container.

2. An apparatus of the character described adapted for cutting food stuffs, comprising, an enclosure adapted to receive food stuffs, having a cover portion movable to a position permitting access to the interior thereof, means operable within the enclosure for cutting the food stuffs, said means including a reciprocable member, and means for preventing movement of said member in one direction while said cover portion is in position to permit access to the interior thereof.

3. An apparatus of the character described adapted for cutting food stuffs, comprising, an enclosure adapted to receive food stuffs, having a cover portion movable to a position permitting access to the interior thereof, cutter and pusher members within the enclosure, a driving member, a driving connection between the driving member and the pusher member, and means cooperating with the cover portion for interrupting said driving connection when said cover portion is in position to permit access to the interior of the enclosure.

4. An apparatus of the character described adapted for cutting food stuffs, comprising, an enclosure adapted to receive food stuffs, a cover portion movable to a position permitting access to the interior thereof, cutter and pusher members within the enclosure, a driving member, a driving connection between the driving member and the pusher member, adapted to move the pusher member forwardly towards the cutter member and rearwardly away from the cutter member, and an interlock between the cover portion and the driving connection to prevent forward movement of the pusher member while the cover portion is in position permitting access to the interior thereof.

5. An apparatus of the character described adapted for cutting food stuffs, comprising, an enclosure adapted to receive food stuffs, a cover portion movable to a position permitting access to the interior thereof, cutter and pusher members within the enclosure, means for actuating the pusher member comprising a drive shaft and including a clutch connected between the drive shaft and pusher member, and means responsive to the position of said cover portion and operating upon the clutch for controlling the connection between the drive shaft and the pusher member.

6. An apparatus of the character described adapted for cutting food stuffs, comprising, an enclosure adapted to receive food stuffs, a cover portion movable to a position permitting access to the interior thereof, a cutter member, a pusher member adapted to move forwardly towards the cutter member or rearwardly away from the cutter member, means for actuating the pusher member, and an interlock between the said cover portion and the actuating means so constructed and arranged as to permit movement of said cover portion only upon the rearward movement of the pusher member.

7. An apparatus of the character described adapted for cutting food stuffs, comprising, an enclosure adapted to receive food stuffs, having a cover portion movable to a position permitting access to the interior thereof, a cutter member, a pusher member adapted to move forwardly towards the cutter member or rearwardly away from the cutter member, means for actuating the pusher member, and in interlock between the cover portion and the actuating means so constructed and arranged as to prevent movement of said cover portion during cutting movement of the pusher member and preventing cutting movement of the pusher member by the actuating means while said cover portion is in open position to permit access to the enclosure.

8. An apparatus of the character described adapted for cutting food stuffs, comprising, an enclosure adapted to receive food stuffs, having a cover portion movable to a position permitting access to the interior thereof, a cutter member, a pusher member adapted to move forwardly towards the cutter member or rearwardly away from the cutter member, means for actuating the pusher member, and an interlock between the movable part of the enclosure and the actuating means so constructed and arranged as to arrest movement of the pusher member in a rearward position upon movement of the cover portion to give access to the interior of the enclosure.

9. An apparatus of the character described, adapted for cutting food stuffs, comprising, a trough adapted to receive food stuffs, a cutter member, a pusher member and means for actuating said pusher member within the trough, through and out of contact therewith, said means including a driving member mounted below the trough and having a driving connection with said pusher member over the side of the trough.

10. An apparatus of the character described, adapted for cutting food stuffs, comprising, a trough adapted to receive food stuffs, a cutter member, and a pusher member adapted to push the food stuffs along the trough, and means for supporting the pusher member out of contact with the trough and for actuating the same therein, said means including a movable arm supported outside the trough and extending laterally over the side of the trough, and means cooperating with the arm to actuate the same.

11. An apparatus of the character described adapted for cutting food stuffs, comprising, a curved trough adapted to receive food stuffs, a cutter member, a pusher member in the trough and spaced from the wall thereof, a pivoted arm for actuating the pusher member and crank means for transmitting an oscillating motion to said arm.

12. An apparatus of the character described adapted for cutting food stuffs, comprising, a curved trough adapted to receive food stuffs, a cutter member, a pusher member in the trough, and means for supporting and actuating the pusher member, said means including an upwardly extending rocking pivoted arm rigidly attached to a laterally extending member secured to the pusher member.

13. An apparatus of the character described adapted for cutting food stuffs, comprising, a curved trough adapted to receive food stuffs, a cutter member, a pusher member in the trough, and means for supporting and actuating the pusher member, said means including an upwardly extending pivoted arm having a laterally extending member secured to the pusher member, and a cover for the trough spaced therefrom at one side thereof to provide a slot for the movement of the laterally extending finger.

14. An apparatus of the character described adapted for cutting food stuffs, comprising, a curved trough adapted to receive food stuffs, a cutter member, a pusher member in the trough, and means for supporting and actuating the pusher member, said means including an upwardly extending pivoted arm having a laterally extending member secured to the pusher member, and a cover for the trough spaced therefrom at one side thereof to provide a slot for the movement of the laterally extending finger, said cover having a laterally and downwardly extending flange to provide a guard at the upper edge of said slot.

15. An apparatus of the character described, adapted for cutting food stuffs, comprising, an upwardly curved trough, a cutter member near one end thereof, and a drain passage in the bottom of the trough sloping downwardly towards the cutter member.

16. Apparatus of the character described adapted for cutting food stuffs, comprising, an enclosure adapted to receive food stuffs, having a cover portion movable to a position permitting access to the interior thereof, a cutter member and an abutment member within the enclosure mounted for relative movement one towards the other, a driving means, a driving connection between the driving means and one of said members, and means cooperating with the cover portion for interrupting said driving connection when said cover portion is in position to permit access to the interior of the enclosure.

17. An apparatus of the character described adapted for cutting food stuffs, comprising, an enclosure adapted to receive food stuffs, having a cover portion movable to a position permitting access to the interior thereof, a cutter member and an abutment member within the enclosure mounted for relative movement one towards the other, means for actuating one of said members, means cooperating with the cover portion and the actuating means for preventing movement of said cover portion during movement of one of said members towards the other and for preventing a relative cutting movement of said members by the actuating means while said cover portion is in open position to permit access to the enclosure.

18. In apparatus of the character described, a grid member comprising a plurality of sections comprising a frame, each section having a plurality of cutting blades arranged unsymmetrically with respect to the center line of the frame, said blades being so arranged on each section as to coincide in one setting thereof, and to be disposed intermediate and parallel to each other to thereby cut thinner slices in an opposite setting thereof, said sections being constructed to be supported with their blades at various angular relations with one another.

19. In apparatus of the character described, a cutter member comprising a symmetrical frame, and a plurality of parallel cutting blades carried thereby, said blades being unsymmetrically arranged with respect to the center line of said frame, whereby said cutter member may be used in conjunction with another similarly shaped cutter member to obtain slices of different thickness.

In testimony whereof I hereto affix my signature.

HERBERT L. JOHNSTON.

CERTIFICATE OF CORRECTION.

Patent No. 1,709,912.                                        Granted April 23, 1929, to

HERBERT L. JOHNSTON.

It is hereby certified that error appears in the printed specification of the above numbered patent requiring correction as follows: Page 5, lines 9 and 10, claim 18, strike out the words "comprising a frame, each section" and insert instead the comma and words ", each section comprising a frame"; and that the said Letters Patent should be read with this correction therein that the same may conform to the record of the case in the Patent Office.

Signed and sealed this 28th day of May, A. D. 1929.

(Seal)

M. J. Moore,
Acting Commissioner of Patents.

movement of one of said members towards the other and for preventing a relative cutting movement of said members by the actuating means while said cover portion is in open position to permit access to the enclosure.

18. In apparatus of the character described, a grid member comprising a plurality of sections comprising a frame, each section having a plurality of cutting blades arranged unsymmetrically with respect to the center line of the frame, said blades being so arranged on each section as to coincide in one setting thereof, and to be disposed intermediate and parallel to each other to thereby cut thinner slices in an opposite setting thereof, said sections being constructed to be supported with their blades at various angular relations with one another.

19. In apparatus of the character described, a cutter member comprising a symmetrical frame, and a plurality of parallel cutting blades carried thereby, said blades being unsymmetrically arranged with respect to the center line of said frame, whereby said cutter member may be used in conjunction with another similarly shaped cutter member to obtain slices of different thickness.

In testimony whereof I hereto affix my signature.

HERBERT L. JOHNSTON.

---

CERTIFICATE OF CORRECTION.

Patent No. 1,709,912.    Granted April 23, 1929, to

HERBERT L. JOHNSTON.

It is hereby certified that error appears in the printed specification of the above numbered patent requiring correction as follows: Page 5, lines 9 and 10, claim 18, strike out the words "comprising a frame, each section" and insert instead the comma and words ", each section comprising a frame"; and that the said Letters Patent should be read with this correction therein that the same may conform to the record of the case in the Patent Office.

Signed and sealed this 28th day of May, A. D. 1929.

(Seal)

M. J. Moore,
Acting Commissioner of Patents.